United States Patent

Bednarski

[11] Patent Number: 6,053,562
[45] Date of Patent: Apr. 25, 2000

[54] DOOR FOR A VEHICLE HAVING A STRUCTURAL FRAME MEMBER AND METHOD OF ASSEMBLING SAME

[75] Inventor: Piotr M. Bednarski, Rochester, Mich.

[73] Assignee: Peregrine Incorporated, Southfield, Mich.

[21] Appl. No.: 08/955,349

[22] Filed: Oct. 21, 1997

[51] Int. Cl.[7] .................................. B62D 25/04
[52] U.S. Cl. ........................ 296/146.5; 296/146.8; 296/146.1; 296/50; 296/56
[58] Field of Search .................. 296/146.8, 146.5, 296/146.1, 146.2, 146.3, 56, 106, 50; 49/503, 502

[56] References Cited

U.S. PATENT DOCUMENTS

| | | | |
|---|---|---|---|
| 4,800,638 | 1/1989 | Herringshaw et al. | 49/502 |
| 4,831,710 | 5/1989 | Katoh et al. | 49/502 |
| 5,398,453 | 3/1995 | Heim et al. | 49/502 |
| 5,408,785 | 4/1995 | Heim et al. | 49/502 |
| 5,449,213 | 9/1995 | Kiley et al. | 296/56 |
| 5,499,520 | 3/1996 | Roper | 72/58 |
| 5,581,947 | 12/1996 | Kowall et al. | 49/502 |
| 5,584,144 | 12/1996 | Hisano | 49/502 |
| 5,729,463 | 3/1998 | Koenig et al. | 364/468.04 |
| 5,787,645 | 8/1998 | Heim et al. | 49/502 |

FOREIGN PATENT DOCUMENTS 405286364  11/1993  Japan .

Primary Examiner—Stephen T. Gordon
Assistant Examiner—Lori L. Coletta
Attorney, Agent, or Firm—Rader, Fishman & Grauer PLLC

[57] ABSTRACT

A door for a vehicle includes a structural tubular frame member having side members which terminate in laterally extending foot portions. At least one outer panel is connected to the tubular frame member. The door further includes a hinge assembly for connecting the door to a vehicle such that the door is movable relative to the vehicle. A method of making the door for a vehicle is also provided.

26 Claims, 2 Drawing Sheets

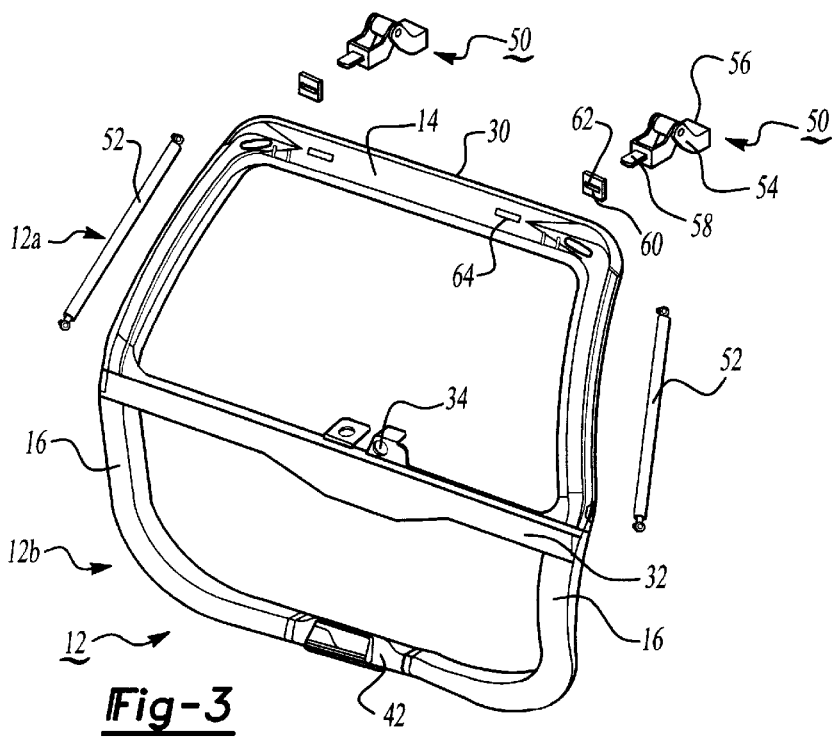
Fig-3
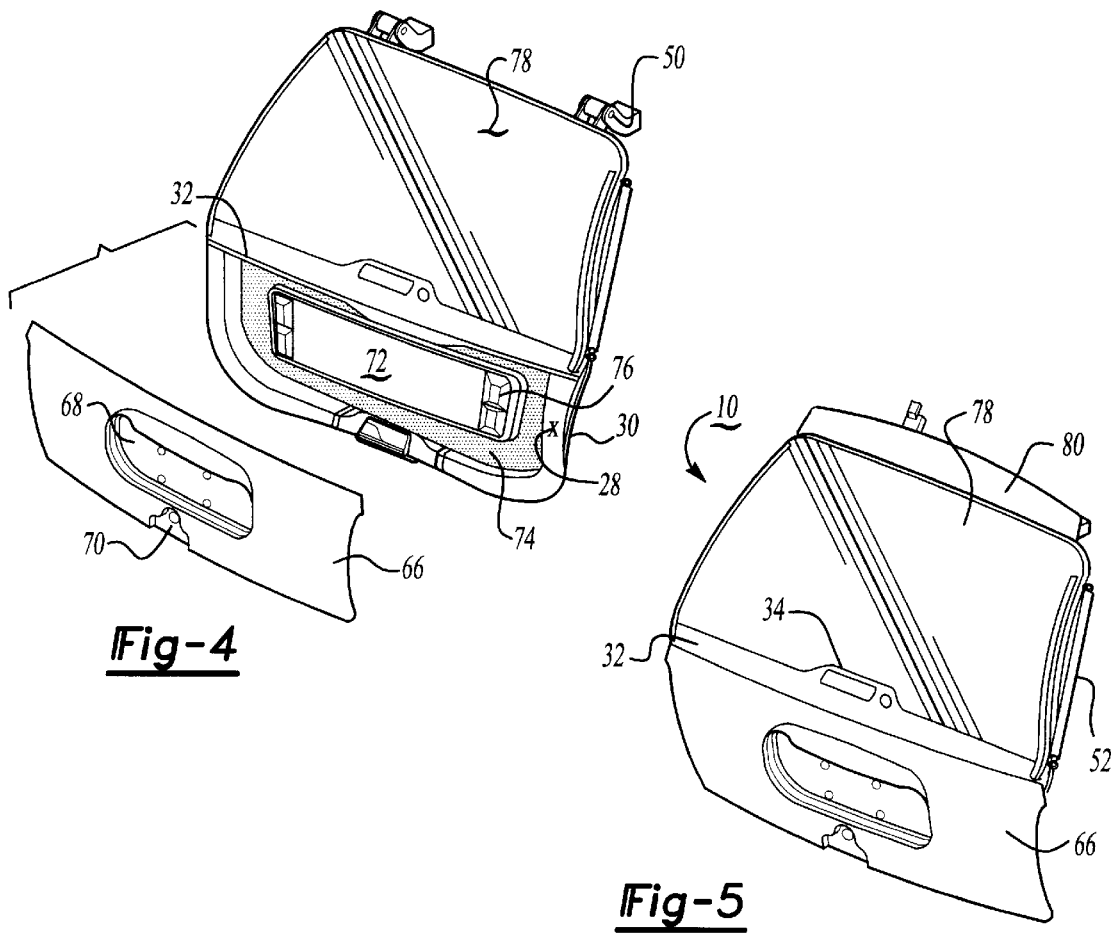
Fig-4
Fig-5

DOOR FOR A VEHICLE HAVING A STRUCTURAL FRAME MEMBER AND METHOD OF ASSEMBLING SAME

FIELD OF THE INVENTION

The present invention relates to a door for a vehicle and, more particularly, to a movable modular door for a vehicle in which vehicle components are connected to a structural frame member.

BACKGROUND OF THE INVENTION

A conventional vehicle door includes two panels, an inner panel and an outer panel, one of the panels having vehicle components mounted thereon. The inner and outer panels are connected together along flanges to form the door. The panels are typically stamped steel and serve as load bearing structural members. Vehicle doors in which the panels serve as structural members are undesirable because they are relatively heavy. Further, conventional vehicle doors must be fully assembled before shipping to a final vehicle assembly site as special tooling is often required for assembly of the vehicle components to the panels. The panels also need to be handled with special care during transport since surface damage of the vehicle panels may occur.

Other known vehicle doors have provided a frame member on which structural panels are attached. These doors include a frame member that has flanges for attaching an inner panel that carries vehicle components. A structural outer panel is then connected to a flange on the inner panel. One disadvantage to flange attached inner and outer panels is that the vehicle door must still be fully assembled before shipping because of special tooling requirements. Further, known vehicle doors of this type are still relatively heavy since the panels provide the structural rigidity for the vehicle door.

Thus, vehicle doors typically have inner and outer panels as a main structural component. The panels are relatively heavy due to the required structural strength for the door. Further, these structural members must be assembled prior to final assembly due to expensive tooling requirements, thereby necessitating the need for special handling of the door to insure against surface damage. Therefore, there exists a need for a vehicle door assembly which provides for modularity of design while decreasing weight and manufacturing costs.

SUMMARY OF THE INVENTION

The present invention is directed to a door for a vehicle. The door includes a structural frame member which is generally C-shaped with a top section connected to two side members. The side members are connected to foot portions that extend laterally and inwardly to provide additional structural rigidity to the frame member. The foot portions include spaced apart terminal ends that define a gap therebetween.

The door also includes a cross-member that connects to and extends between the side members. The cross-member has a front portion and a rear portion that connect together in mating engagement such that the side members are disposed between the front and rear portions of the cross-member. The cross-member may further be provided with an accessory mounting portion, thereby permitting vehicle accessories to be mounted to the frame member.

At least one outer panel is provided which connects to the frame member. The door may, optionally, be provided with two outer panels, an upper outer panel that connects to a top half of the frame member, and a lower outer panel that connects to a bottom half of the frame member. Further, the panels may be sized and positioned such that an opening is provided between them in which a window member may be positioned.

The door further includes a hinge assembly which connects the door to a vehicle such that the door is movable relative to the vehicle. Preferably, the hinge assembly includes a mounting protrusion which is adapted to engage an aperture disposed in the frame member to simplify assembly and increase rigidity in the hinge areas.

The door also may have an inner panel connected to the frame member and a latch assembly positioned in the gap formed by the foot portions. Such an inner panel typically includes vehicle trim components. The latch assembly includes both upper and lower housings which connect together in mating engagement such that ends of the foot portions are disposed between the two housings.

The present invention is also directed to a method of assembly for a door having a structural frame member with foot portions. Preferably, the frame member is hollow with a continuous thin wall that is formed into varying cross-sections by hydroforming.

Steps for assembling the door include: connecting the cross-member to the side members, mounting vehicle accessories to the cross-member, securing at least one hinge assembly to a section of the frame member, connecting an inner panel to the rear surface of the frame member, and connecting an outer panel to a front surface of the frame member. Optionally, two outer panels may be provided which connect to the frame member such that the outer panels are spaced apart. A window member may then be connected to the frame member between the two outer panels.

The frame member, with the cross-member, latch assembly, and inner panel connected, is shipped to a final vehicle assembly site. The outer panels, which are shipped separately, are painted with the vehicle body to insure proper paint and finish match. The outer panels are then connected to the frame member, preferably by bonding, thereby reducing tooling requirements, providing for quick and easy door assembly, and reducing the likelihood of surface damage to the panels during transport. Further, the frame member is preferably hydroformed from a mild steel while the inner and outer panels are constructed from a thermoplastic material, thereby reducing the weight of the vehicle door while still maintaining the structural integrity of the vehicle door.

BRIEF DESCRIPTION OF THE DRAWINGS

The features and inventive aspects of the present invention will become more apparent upon reading the following detailed description, claims, and drawings, of which the following is a brief description:

FIG. 3 is a perspective view of the structural frame member showing an exploded view of a hinge assembly.

FIG. 4 is a perspective view of the vehicle door with vehicle components attached to the structural frame member.

FIG. 5 is perspective view of an assembled vehicle door having a structural frame member in accordance with the present invention.

DESCRIPTION OF PREFERRED EMBODIMENTS

Figure 1:
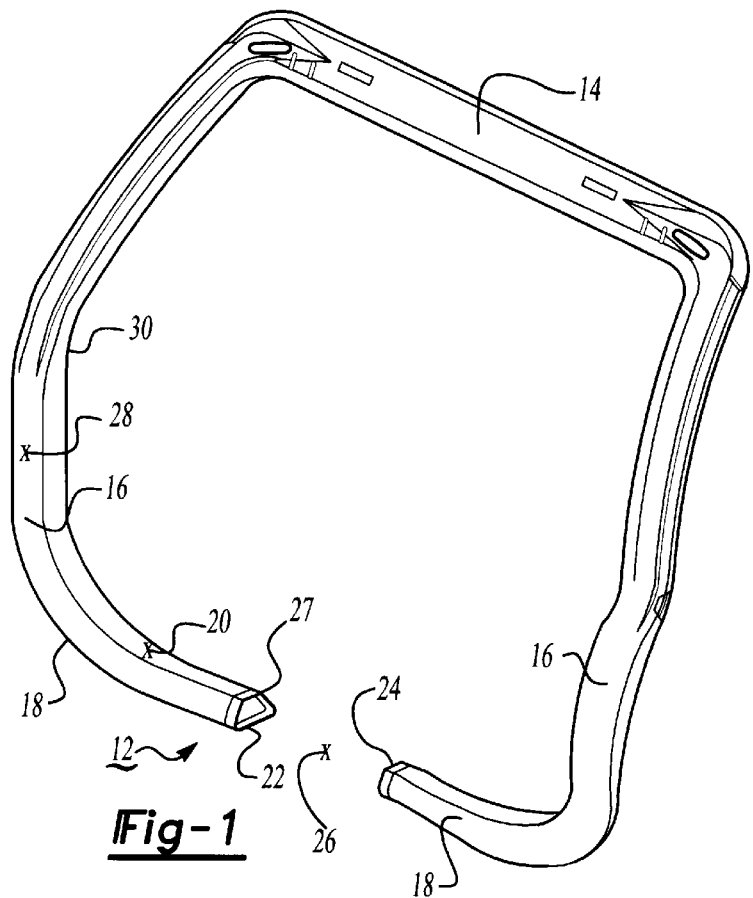
FIG. 1 is a perspective view of the structural frame member.

FIG. 1 shows a, hollow, generally C-shaped frame member 12 that serves as a main structural component for a vehicle door. Frame member 12 has a top section 14, with first and second ends, and two substantially parallel side members 16, both having distal ends. Top section 14 is connected to side members 16 at first and second ends of top section 14. Side members 16 connect to inwardly laterally extending foot portions 18 at distal ends of side members 16. Foot portions have an upper surface 20 and a lower surface 22 and further include spaced apart terminal ends 24 that define a gap 26. Foot portions 18 provide frame member 12 with added strength and rigidity, as well as connection points for vehicle hardware. Furthermore, gap 26 facilitates hydroforming frame member 12 by providing an inlet for introducing fluid.

In a preferred embodiment, frame member 12 is constructed from a single elongated tube having a generally continuous thin outer wall 27 that is shaped to define a front surface 28 and a rear surface 30. Frame member 12 is preferably constructed of mild steel and formed into the preferred shape using a hydroforming process in which pressurized fluid is introduced into one of terminal ends 24 with the other end sealed. The hydroforming process shapes frame member 12 into various cross-sections, thereby providing a strong and rigid frame member 12. The varied cross-sections also provide surfaces on which vehicle components, such as a windshield or a door panel, may be connected. However, it is understood that frame member 12 can be made from any suitable material using any known forming techniques.

Figure 2:
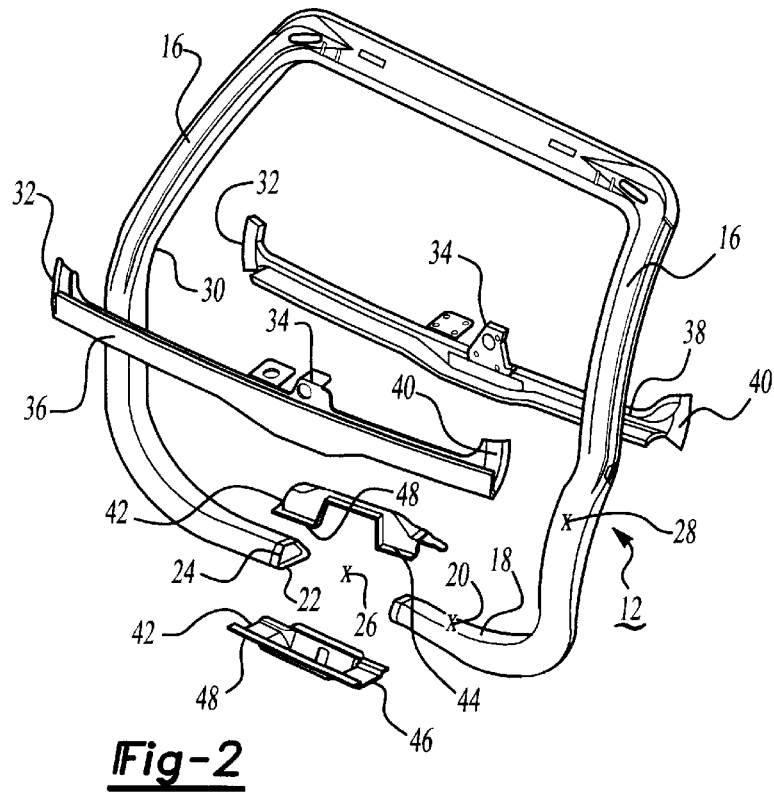
FIG. 2 is a perspective view of the structural frame member with an exploded view of a cross-member and latch housing.

Referring to FIG. 2, door 10 further includes a cross-member 32 having an optional accessory mounting portion 34 for mounting vehicle accessories, such as a windshield wiper motor or a rear brake light, to door 10. In the preferred embodiment, cross-member 32 includes a front portion 36 and a rear portion 38, each having opposing peripheral flanges 40 that are longer in length than the width of frame member 12. Portions 36 and 38 may be distinct components. In assembling door 10, front portion 36 engages front surface 28 of frame member 12 along side members 16. Rear portion 38 engages rear surface 30 of frame member 12 along side members 16. Opposing peripheral flanges 40 are then connected together around side members 16, such that side members 16 are disposed between front portion 36 and rear portion 38. Thus, cross-member 32 is securely connected to frame member 12. Cross-member 32 is shown mounted on frame member 12 such that it bisects frame member 12 into a top half 12a and a bottom half 12b as shown in FIG. 3. Peripheral flanges 40 are connected together by spot welding or other suitable fastening techniques. Further, assembled cross-member 32 may be additionally secured to frame member 12 by welding or other suitable assembly technique.

Door 10 is also includes a latch housing assembly 42 for a door lock. Latch housing assembly 42 includes an upper housing 44 and a lower housing 46, each having opposing peripheral flanges 48. Preferably, upper and lower housings 44 and 46 are longer in length than gap 26 of frame 12 and connect to frame member 12 in a similar fashion as cross-member 32. Upper housing 44 engages upper surface 20 of foot portions 18 at terminal ends 24. Lower housing 46 engages lower surface 22 of foot portions 18 at terminal ends 24. Upper and lower housings 44 and 46 are connected together in mating engagement along opposing peripheral flanges 48 such that terminal ends 24 are disposed between upper and lower housings 44 and 46. Thus, latch housing assembly 42 is connected to frame member 12 and positioned in gap 26 as shown in FIG. 3. Peripheral flanges 48 are connected together by spot welding or other suitable assembly techniques. Further, upper and lower housing 44 and 46 may be further secured to frame member 12 through welding or other suitable assembly techniques.

Referring to FIG. 3, at least one hinge assembly 50 is provided for connecting door 10 to a vehicle such that door 10 is movable relative to the vehicle. Door 10 has two hinge assemblies 50 and further includes struts 52 that are mounted on side members 16. Hinge assembly 50 includes a hinge 54 having a vehicle mounting plate 56 which connects to the vehicle. In a preferred embodiment, hinge assembly 50 further includes a mounting protrusion 58 that cooperates with a frame mounting plate 60 to connect hinge 54 to frame member 12. Frame mounting plate 60 includes at least one aperture 62 that is adapted to receive mounting protrusion 58. Frame member 12 further includes at least one aperture 64 which corresponds to aperture 62 of frame mounting plate 60.

To connect hinge assembly 50 to frame member 12, frame mounting plate 60 is positioned on frame member 12, against rear surface 30 of top section 14, such that aperture 62 aligns with aperture 64. Mounting protrusion 58 is inserted through apertures 62 and 64 until it is flush with front surface 28 of frame member 12. Mounting protrusion 58 is then secured in aperture 62 to frame member 12 through welding or other suitable assembly techniques.

As shown in FIGS. 4 and 5, door 10 includes at least one outer panel 66 having substantially the same width as frame member 12. Outer panel 66 is preferably shipped separate from the rest of door 10 and painted along with the vehicle body prior to assembly thereby assuring proper paint and finish match while eliminating the need for a duplicate paint booth at the door supplier. Outer panel 66 is then connected to front surface 28 of frame member 12 by bonding or other suitable assembly techniques at the final vehicle assembly site. In a preferred embodiment, outer panel 66 is substantially half the length of frame member 12 and is positioned on the bottom half 12b of frame member 12 such that an upper edge of outer panel 66 is also connected to cross-member 32. To reduce material costs and to minimize the weight of the door, outer panel 66 is preferably constructed of a light-weight thermoplastic material, although any suitable material may be used. Additionally, outer panel 66 includes recessed areas 68 and 70 for mounting a license plate and door latch assembly, respectively.

Door 10 may optionally include an inner panel 72, shown in FIG. 4, which is connected to rear surface 30 of frame member 12 prior to shipping to the final vehicle assembly site. Inner panel 72 may include vehicle trim components, such as a decorative fabric covering 74 or vehicle lights 76. Preferably, inner panel 72 is connected to frame member 12 with a snap-together mechanism or other suitable assembly techniques, thereby providing for ease of assembly and reducing tooling costs.

FIGS. 4 and 5 also show an optional window member 78 connected to frame member 12. Window member 78 may be fixedly secured to frame member 12 by bonding, thereby further increasing the structural rigidity of door 10.

Optionally, window member 78 can be pivotally connected to frame 12 allowing window member 78 to be selectively opened.

As illustrated in FIG. 5, a second, optional upper outer panel 80 is connected to frame member 12 along top section 14. Upper outer panel 80 is vertically spaced away from outer panel 66 with window member 78 positioned therebetween. Upper outer panel 80 is bolted onto frame member 12, although any suitable connecting means can be utilized.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A door for a vehicle, comprising:

a tubular frame member having a front surface and a rear surface, including:

a top section;

two side members having proximal and distal ends; and laterally extending foot portions having an upper surface and a lower surface;

said top section being connected to said two side members at said proximal ends of said two side members and said foot portions connected to said two side members at said distal ends of said two side members;

at least one outer panel connected to said tubular frame member; and at least one hinge assembly secured to said tubular frame member, said hinge assembly connectable to a vehicle such that said door is movable relative to the vehicle, said hinge assembly further including a mounting projection adapted to engage an aperture disposed in said tubular frame member.

2. The door of claim 1, wherein said tubular frame member is hydroformed.

3. The door of claim 2, wherein said tubular frame member has a variable cross-section.

4. The door of claim 1, wherein said door further includes an inner panel connected to said tubular frame member.

5. The door of claim 1, wherein said door further includes a cross-member connected to said two side members.

6. The door of claim 5, wherein said cross-member further includes an accessory mounting portion.

7. The door of claim 6, wherein said cross-member has a front portion and a rear portion, said front portion being connected to said rear portion in a mating engagement such that said front portion engages said front surface of said tubular frame member along a section of said two side members and said rear portion engages said rear surface of said tubular frame member along said section of said two side members, thereby connecting said cross-member to said tubular frame member.

8. The door of claim 7, wherein said outer panel is connected to a bottom half of said tubular frame member along said front surface of said two side members and along a front surface of said cross-member.

9. The door of claim 8, wherein said outer panel is bonded to said tubular frame member and said cross-member.

10. A door for a vehicle comprising:

a tubular, generally C-shaped frame member formed with a continuous thin wall, having a front surface and a rear surface, including:

a top section;

two side members each having proximal and distal ends; and inwardly, laterally extending foot portions having terminal ends spaced apart to define a gap, said foot portions further including an upper surface and a lower surface;

said top member connected to said two side members at said proximal ends of said side members;

said foot portions connected to said two side members at said distal ends of said two side members;

a cross-member connected to said tubular frame member between said two side members;

at least one outer panel connected to said tubular frame member; and at least one hinge assembly secured to said tubular frame member, said hinge assembly connectable to a vehicle such that said door is movable relative to the vehicle.

11. The door of claim 10, wherein said door further includes an inner panel connected to said tubular frame member.

12. The door of claim 10, wherein said cross-member has an accessory mounting portion, said cross-member further including a front portion and a rear portion, said front portion connected to said rear portion in a mating engagement such that said front portion engages said front surface of said tubular frame member along a section of said two side members and said rear portion engages said rear surface of said tubular frame member along said section of said two side members, thereby connecting said cross-member to said tubular frame member.

13. The door of claim 10, wherein said outer panel is bonded to a bottom half of said tubular frame member along said front surface of said two side members and along a front surface of said cross-member.

14. The door of claim 13, wherein said at least one outer panel further includes an upper outer panel connected to said top section of said tubular frame member along said front surface such that said upper outer panel is vertically spaced apart from said outer panel and a window member is connected to said tubular frame member between said outer panels.

15. The door of claim 10, Wherein said gap is adapted to receive a latch assembly having an upper housing and a lower housing, said upper housing connected to said lower housing in a mating engagement such that said upper housing engages said lower surface of said foot portions at said terminal ends, thereby securing said latch assembly in said gap.

16. A method of making a door for a vehicle, comprising:

providing at least one tubular frame member having a continuous thin wall;

forming said tubular frame member with a top section and two side members that terminate in laterally extending foot portions, wherein said tubular frame member further includes a front surface and a rear surface, wherein said foot portions have spaced apart terminal ends defining a gap therebetween;

connecting a cross-member to a section of said two side members, securing at least one hinge assembly to said top member of said tubular frame member;

connecting an inner panel to said rear surface of said tubular frame member; and connecting at least one outer panel to said front surface of said tubular frame member.

17. The method of claim 16, wherein said tubular frame member is hydroformed to form multiple predetermined cross-sections.

18. The method of claim 17, wherein the step of connecting said at least one outer panel comprises bonding.

19. The method of claim 18, wherein said at least one outer panel further includes two outer panels such that step of connecting said at least one outer panel further includes spacing said two outer panels away from one another to form an opening, wherein a window member is secured in said opening.

20. The method of claim 16, wherein said cross-member includes a front portion and a rear portion, said steps of connecting said cross-member further includes connecting said front portion to said rear portion in a mating engagement such that said front portion engages said front surface of said tubular frame member along a section of said two side members and said rear portion engages said rear surface of said tubular frame member along said section of said two side members.

21. The method of claim 17, further including positioning a latch assembly in said gap, wherein said latch assembly includes an upper housing and a lower housing, said upper housing connects to said lower housing in a mating engagement such that said upper housing engages a top surface of said foot portions at said terminal ends and said lower housing engages a bottom surface of said foot portions at said terminal ends.

22. A door for a vehicle comprising:
a hydroformed generally C-shaped tubular frame member having a top section, connected to two side members which terminate in inwardly laterally extending foot portions with spaced apart terminal ends that define a gap, wherein said tubular frame member is formed as a continuous thin having a front surface and a rear surface, wherein said foot portions further include an upper surface and a lower surface;
a cross-member connected to said tabular frame member, said cross-member having a front portion and a rear portion, said front portion connected to said rear portion in a mating engagement such that said front portion engages said front surface of said frame member along a section of said two side members and said rear portion engages said rear surface of said frame member along said section of said two side members, thereby connecting said cross-member to said tubular frame member, said cross-member further including an accessory mounting portion;
a latch assembly including an upper housing and a lower housing, said upper housing connected to said lower housing in a mating engagement such that said upper housing engages said upper surface of said foot portions at said terminal ends and said lower housing engages said lower surface of said foot portions at said terminal ends, thereby securing said latch assembly in said gap to said tubular frame member;
a lower outer panel bonded to a bottom half of said tubular frame member along said front surface of said frame member and said front member of said cross-member;
an upper outer panel connected to said top section of said tubular frame member along said front surface of said frame member, said upper outer panel being vertically spaced apart from said lower outer panel thereby defining an opening;
at least one inner panel connected to said frame member and said cross-member;
at least one window section secured to said frame member and said cross-member in said opening between said upper outer panel and said lower outer panel; and
at least one hinge assembly secured to said tubular frame member, said hinge assembly including a mounting protrusion adapted to engage with an aperture disposed in said tubular frame member, said hinge assembly connectable to a vehicle such that the door is movable relative to said vehicle.

23. A door for a vehicle, comprising:
a tubular frame member having a front surface and a rear surface, including:
a top section;
two side members each having proximal and distal ends; and
laterally extending foot portions having an upper surface and a lower surface, wherein said foot portions have spaced part terminal ends that define a gap, said gap adapted to receive a latch assembly;
said top section being connected to said two side members at said proximal ends of said two side members and said foot portions connected to said two side members at said distal ends of said two side members;
at least one outer panel connected to said tubular frame member; and
at least one hinge secured to said tubular frame member, said hinge assembly connectable to a vehicle such that said door is movable relative to the vehicle.

24. A door for a vehicle, comprising:
a tubular frame member having a front surface and a rear surface, including:
a top section;
two side members each having proximal and distal ends; and
laterally extending foot portions having an upper surface and a lower surface;
said top section being connected to said two side members at said proximal ends of said two side members and said foot portions connected to said two side members at said distal ends of said two side members;
at least one outer panel connected to said tubular frame member, wherein said at least one outer panel further includes an upper outer panel connected to a top half of said tubular frame member along said front surface; and
at least one hinge secured to said tubular frame member, said hinge assembly connectable to a vehicle such that said door is movable relative to the vehicle.

25. The door of claim 23, wherein said latch assembly includes an upper housing and a lower housing said upper housing connected to said lower housing in a mating engagement such that said upper housing engages said lower surface of said foot portions at said terminal ends and said lower housing engages said lower surface of said foot portions at said terminal ends, thereby securing said latch assembly in said gap.

26. The door of claim 24, wherein said outer panels are vertically spaced apart and a window member is disposed between said outer panels.

* * * * *

UNITED STATES PATENT AND TRADEMARK OFFICE
CERTIFICATE OF CORRECTION

PATENT NO. : 6,053,562
DATED : April 25, 2000
INVENTOR(S) : Piotr M. Bednarski

It is certified that error appears in the above-indentified patent and that said Letters Patent is hereby corrected as shown below:

Col. 7, line 32
 replace "thin having"
 with -- thin wall having --
Col. 8, line 53
 replace "housing said"
 with --housing, said--.
Col. 8, line 55
 replace "lower"
 with --upper--.

Signed and Sealed this

Twenty-seventh Day of March, 2001

*Attest:*

NICHOLAS P. GODICI

*Attesting Officer*     *Acting Director of the United States Patent and Trademark Office*